(12) United States Patent
Zhang et al.

(10) Patent No.: US 11,573,298 B2
(45) Date of Patent: Feb. 7, 2023

(54) OPA-BASED LASER RADAR TRANSCEIVER ANTENNA AND DISTANCE MEASUREMENT METHOD

(71) Applicant: SHENZHEN LITRA TECHNOLOGY CO., LTD., Nanshan District Shenzhen (CN)

(72) Inventors: Zhongxiang Zhang, Nanshan District Shenzhen (CN); Dingning Yang, Nanshan District Shenzhen (CN); Kangda Wu, Nanshan District Shenzhen (CN); Hongqiang Yang, Nanshan District Shenzhen (CN)

(73) Assignee: SHENZHEN LITRA TECHNOLOGY CO., LTD., Guangdong (CN)

( * ) Notice: Subject to any disclaimer, the term of this patent is extended or adjusted under 35 U.S.C. 154(b) by 340 days.

(21) Appl. No.: 16/755,463

(22) PCT Filed: Aug. 30, 2017

(86) PCT No.: PCT/CN2017/099681
§ 371 (c)(1),
(2) Date: Apr. 10, 2020

(87) PCT Pub. No.: WO2019/028948
PCT Pub. Date: Feb. 14, 2019

(65) Prior Publication Data
US 2021/0215800 A1 Jul. 15, 2021

(30) Foreign Application Priority Data
Aug. 11, 2017 (CN) .......................... 201710687687.4

(51) Int. Cl.
*G01S 17/06* (2006.01)
*G01S 17/08* (2006.01)
*G01S 7/481* (2006.01)

(52) U.S. Cl.
CPC ............ *G01S 7/4817* (2013.01); *G01S 17/08* (2013.01)

(58) Field of Classification Search
CPC ...... G01S 7/4817; G01S 17/08; G01S 7/4815; G01S 7/4816; G01S 7/481; G01S 7/483
See application file for complete search history.

(56) References Cited

U.S. PATENT DOCUMENTS

| 6,341,136 B1 | 1/2002 | Hiiro | |
|---|---|---|---|
| 2018/0052378 A1* | 2/2018 | Shin | ........................ G02F 1/292 |

(Continued)

FOREIGN PATENT DOCUMENTS

| CN | 103645470 A | 3/2014 |
|---|---|---|
| CN | 103760689 A | 4/2014 |
| CN | 207008051 U | 2/2018 |

OTHER PUBLICATIONS

CN103645470A Double-electronic-control scanning laser phased array radar, 3 pages. (Year: 2022).*

(Continued)

*Primary Examiner* — Tuyen K Vo
(74) *Attorney, Agent, or Firm* — Cantor Colburn LLP

(57) ABSTRACT

An OPA-based laser radar transceiver antenna and a distance measurement method; the OPA-based laser radar transceiver antenna comprises a distance measurement module based on a single-point transceiver, a signal processing module, a central controller and a laser driving module; the laser driving module and the signal processing module are both connected to the central controller. The distance measurement module comprises a single-point transmitting unit and a single-point receiving unit; the laser driving module drives the single-point transmitting unit to emit a light beam, and controls the light signal transmission direction of the light beam; the single-point receiving unit receives the light signal reflected by a detected object and transmits same to (Continued)

the signal processing module for processing so as to calculate the displacement of the detected object. The single-point transmitting unit and the single-point receiving unit can be a transmissive OPA and can also be a reflective OPA; the central point of the emitted light and the received light can be on the same optical axis or can be on different optical axes, such that the design of the transceiver antenna of the laser radar system achieves solid-state imaging scanning, providing the advantages of low cost, high signal-to-noise ratio, etc.

10 Claims, 6 Drawing Sheets

(56) References Cited

U.S. PATENT DOCUMENTS

| | | | | |
|---|---|---|---|---|
| 2018/0130843 A1* | 5/2018 | Jo | ............... | H01L 31/074 |
| 2020/0386866 A1* | 12/2020 | Gilbergs | ............... | G01S 7/4814 |
| 2021/0109197 A1* | 4/2021 | O'Keeffe | ............... | G01S 7/4816 |
| 2022/0018961 A1* | 1/2022 | O'Keeffe | ............... | G01S 17/10 |

OTHER PUBLICATIONS

CN103760689A Expected multi-beam far field focal spot position control method based on optical phased arrays, 20 pages. (Year: 2022).*
English Machine Translation Abstract of CN103645470.
English Machine Translation Abstract of CN103760689.
English Machine Translation Abstract of CN207008051.
English Translation Written Opinion for Application No. PCT/CN2017/099681.
International Search Report for Application No. PCT/CN2017/099681.
Principle of Laser and Infrared Detection; Dai, Yongjiang; Oct. 1, 2012.
Written Opinion for Application No. PCT/CN2017/099681.
Ye, Zhengyu et al.; Optical-phased-array (OPA) Technology Applied to Laser Radar Opto-Electronic Engineering; vol. 39, No. 2 (Feb. 29, 2012).

* cited by examiner

OPA-BASED LASER RADAR TRANSCEIVER ANTENNA AND DISTANCE MEASUREMENT METHOD

CROSS-REFERENCE TO RELATED APPLICATIONS

The present application is a National Stage of PCT Application No. PCT/CN2017/099681 filed on Aug. 30, 2017, which claims priority to Chinese Patent Application No. 201710687687.4, filed on Aug. 11, 2017, the contents each of which are incorporated in the present application by reference in their entirety.

TECHNICAL FIELD

The present application relates to a high cost-effective solid-state lidar using electrically controlled scanning, and in particular to a lidar transceiver antenna based on an optical phased array (OPA), and a distance measurement method.

BACKGROUND

Lidar technology has been applied as early as the 1970s, and in the beginning it was mainly used to avoid obstacles and prevent collisions when ships entered the port. In the 1980s, as optical devices such as photodiodes, CCDs (charge coupled devices), and CMOSs (complementary metal oxide semiconductors) etc. developed slowly, the lidars began to be used for precise positioning when the space shuttle recovered satellites. The power for driving technologies develop is often the pressure of a war. During the Gulf War, the lidar has been widely used to control taking off or landing of a helicopter on the ship deck and guide night flight for the helicopter. American Hughes, Schwatz, Sparate, Lorrel Systems, French Thomson and others have respectively developed lidar imaging systems used for the fields such as battlefield reconnaissance, low-altitude flight control, active laser guidance and the like. With the further development of semiconductor optoelectronic devices, the cost of components has been gradually reduced, and the components' performance is continuously improved, thus laying a foundation for the lidar technology to cover a civilian field. The lidars are slowly applied in the fields such as machine vision, car assisted driving, video games, medical and health, leisure and entertainment, and smart home etc. The core of the lidar technology is laser ranging, but developing to where it is today, the concept for the lidars has far exceeded the category of "ranging".

Modern radar technology is, in general, the eyes provided by the machine industry for humans to explore the three-dimensional world, and microwave radars and ultrasonic radars etc. are the most common. While the lidar, as a means of optical detection, has played an unprecedented role in many fields since its presence due to its many advantages like high precision, directionality, monochromaticity, coherence, etc., and the application fields include industry, agriculture, medicine, national defense, and the like. Developing to where it is today, the lidar technology have been widely used in many popular consumer electronics, for example, Microsoft's 3D sensor Kinect in Xbox uses the ToF (time-of-flight) technology of the lidar, and Intel's 3D sensing module RealSense is based on structured light technology. In addition, the lidar is also used in human-computer interaction in video games, motion capture in leisure and entertainment electronics, OCT (optical coherence tomography) in medical and health fields, indoor positioning in smart homes, and 3D imaging and human-computer interaction, etc.

An optical scanning system is essential in the transition of the lidar from a single-point ranging system to a two-dimensional or three-dimensional imaging system. As mentioned above, the current applications are mainly focused on mechanical scanning, including optical vibration mirrors, customized coaxial rotary mirrors, and so on. They all have characteristics of relative heaviness, difficulty in integration and high production cost, which is very difficult to meet the requirements of most consumer-level applications. The non-mechanical scanning of the beam has many advantages, one of the significant characteristics is that the scanning area and scanning points can be adjusted randomly, so that the lidar system can change the scanning area and dynamically adjust the scanning density according to the needs of the environment.

At present, there are two typical schemes of integrated optical scanning systems, one of which is an electrically controlled scanning implemented by micro-mirrors of a MEMS (micro-electromechanical system), and the other is an OPA. The scanning system with the MEMS micro-mirrors solves some of the shortcomings of the mechanical scanning, such as difficulty in integration, but it still cannot meet the application requirements in terms of scanning speed and stability due to mechanical vibration. While, the OPA is an important development direction in the future, and has huge advantages in terms of cost and integration. Its principle is to adjust the phase of the emitted light wave through the method of the optical antenna array, so as to achieve the purpose of controlling the emission direction of the light wave or adjusting the emission mode of the light spot. Its concept is similar to that of the phased array radar of the microwave radar, which realizes non-mechanical scanning. The current mainstream lidar with an optical phase array is based on integrated silicon photonics, in which the transceiver antenna unit provided with characteristics such as high integration and low cost etc. However, the integrated silicon-based lidar has shortcomings such as difficulty in processing, large on-chip coupling loss, and low speed of the silicon-based phase modulator, and the like.

Therefore, the prior art has defects and needs to be improved.

SUMMARY

Regarding the defects existed in the above mentioned technologies, the present application provides a scanning lidar transceiver antenna and a ranging method thereof with low cost, low processing difficulty and high performance.

In order to achieve the above purpose, the present application provides a lidar transceiver antenna based on an OPA, which includes: a ranging module based on a single-point transceiver, a signal processing module, a central controller and a laser driving module, wherein the laser driving module and the signal processing module are connected to the central controller; wherein the ranging module includes a single-point emission unit and a single-point receiving unit configured to receive an optical signal reflected by a target object, the single-point emission unit includes an emitter generating the optical signal and an emission-type OPA chip configured to adjust optical phase of the emitted optical signal, the single-point receiving unit includes an reception-type OPA chip configured to adjust the optical phase of the optical signal reflected by the target object and an optical receiver configured to receive emitted light, the emitter is connected to the laser driving module, the laser driving module is configured to drive the emitter to emit a light beam, the optical receiver is connected to the signal processing module, and the signal processing module processes the optical signal emitted by the optical receiver and computes distance of the target object; wherein the emission-type OPA chip and the reception-type OPA chip are connected to the central controller, the emission-type OPA chip controls emission direction of the emitted light, and the reception-type OPA chip controls emission direction of received light.

Further, each of the emission-type OPA chip and the reception-type OPA chip is a chip having a resonant structure, and includes a signal input unit, an optical antenna, an electrically controlled phase modulation unit, a feed network and a coupling unit, the signal input unit is provided with an optical scanning unit, and receives the optical signal, and generates a control signal transmitted to the electrically controlled phase modulation unit by the feed network, the electrically controlled phase modulation unit adjusts optical phase of the optical signal, and the coupling unit couples the control signal of the phase and transmits the control signal to the optical antenna; an active area of an OPA of the emission-type OPA chip is greater than 4 mm2, and an active area of an OPA of the reception-type OPA chip is greater than 25 mm2.

Further, the single-point emission unit further includes a collimating lens configured to collimate the emitted light, the collimating lens is designed as a single lens or a lens group; a fast axis and a slow axis of the light beam emitted by the emitter are respectively collimated by the collimating lens, such that the divergent emergent light is collimated to be approximately parallel light which is vertically coupled to the OPA chip, and emergent direction of the light is adjusted by the emission-type OPA chip.

Further, the single-point receiving unit further includes a receiving optical lens combined by a single lens or a lens group and having a diameter ranging from 5 mm to 40 mm, such that a larger clear aperture is obtained to pass through the reflected optical signal and the optical signal reflected by the target object is focused to the optical receiver.

A ranging method, applied to the lidar transceiver antenna, wherein the ranging module ranges the target object by a way of ranging ToF, and the method includes steps of:

controlling, by the central controller, the laser driving module to drive the emitter to emit a light beam as a light signal source;

collimating, by the collimating lens, the light beam emitted by the emitter and transmitting the collimated light beam to the emission-type OPA chip;

receiving, by the emission-type OPA chip, the optical signal transmitted by t the collimating lens, and controlling the emission direction of the emitted light through performing optical phase adjustment on the emitted light;

receiving, by the reception-type OPA chip, the emitted light reflected by the target object, and controlling the emission direction of the received light through performing optical phase adjustment on the received light;

focusing, by the receiving optical lens, the received light and transmitting the focused light to the optical receiver, and then calculating displacement of the target object by the signal processing module.

Further, the electrically controlled phase modulation unit in each of the emission-type OPA chip and the reception-type OPA chip includes an X-axis electrically controlled phase modulation unit and a Y-axis electrically controlled phase modulation unit, and the feed network includes an X-axis feed network and a Y-axis feed network; when phase adjustment is performed on the optical signal, the optical phase adjustment of the X axis and the optical phase adjustment of the Y axis are performed respectively, and then a coupling process is performed; the phase adjustment process for the emitted light by the emission-type OPA chip is consistent with the phase processing process for the received light by the reception-type OPA chip, and the optical signal is processed as follows:

the optical scanning unit of the signal input unit scans the optical signal and generates a control signal;

the control signal is transmitted to the X-axis electrically controlled phase modulation unit through the X-axis feed network of the feed network for optical phase adjustment of the X axis, and the control signal is transmitted to the Y-axis electrically controlled phase modulation unit through the Y-axis feed network for optical phase adjustment of the Y axis;

the X-axis optical phase control signal is linked to the optical antenna through the X-axis connection wire, and the Y-axis optical phase control signal is linked to the optical antenna through the Y-axis connection wire;

the coupling unit couples the X-axis optical phase control signal and the Y-axis optical phase control signal to the optical antenna.

Further, the centers of the emitted light and the received light are on the same axis.

Further, the centers of the emitted light and the received light are on different axes.

Further, the emission-type OPA chip and the reception-type OPA chip use a transmissible OPA to perform the optical phase modulation for the emitted light and the received light.

Further, the emission-type OPA chip and the reception-type OPA chip use a reflective OPA to perform the optical phase modulation for the emitted light and the received light.

BENEFICIAL EFFECTS

The beneficial effects of the present application lie in that: compared with the prior art, the lidar transceiver antenna based on the OPA provided by the present application includes a ranging module based on a single-point transceiver, a signal processing module, a central controller and a laser driving module, the laser driving module and the signal processing module are connected to the central controller; the ranging module includes a single-point emission unit and a single-point receiving unit, the laser driving module is configured to drive the single-point emission unit to emit a light beam and controls the emission direction of the optical signal of this light beam, and the single-point receiving unit receives the optical signal reflected by the target object and transmits it to the signal processing module for processing to calculate the displacement of the target object. The single-point emission unit and the single-point receiving unit may be transmissible OPAs or may be reflective OPAs, the centers of the emitted light and the received light may be on the same optical axis or on different two optical axes, such that the design of the transceiver antenna of the lidar system enables the imaging scanning to be solidified, and has the advantages of low cost and high signal-to-noise ratio.

By combining traditional optical tools and OPAs, the present application realizes solid-state of the transceiver antenna, which greatly reduces the requirements of the micro-nano processing technology. In addition, the present application adopts the design of the OPA in which the emission from the light source is synchronous with the reception, avoids using the wide-angle receiving method at the receiving terminal, and maintains the technical characteristic of the narrow field of view of the lidar, thereby making the ladar more adaptable to environments with strong light, have higher signal-to-noise ratio and stronger anti-interference ability. The use of resonant OPAs will further replace the function of narrow-band filters and achieve a better filtering effect.

Figure 1:
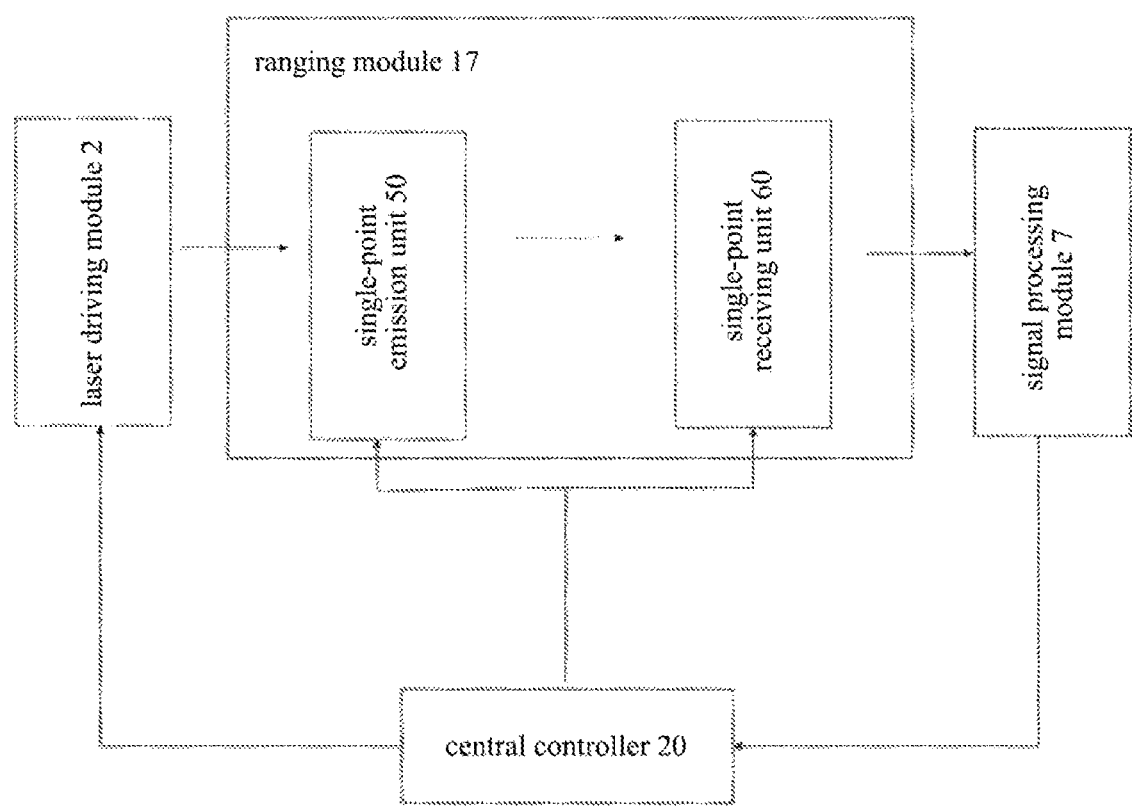
FIG. 1 is an illustration of the principle of the present application.

Signs of main components are illustrated as follows:

| | |
|---|---|
| 1. emitter | 2. laser driving module |
| 3. collimating lens | 4. emission-type OPA chip |
| 5. lobe pattern emitted by antenna | 6. optical receiver |
| 7. signal processing module | 8. receiving optical lens |
| 9. reception-type OPA chip | 10. lobe pattern received by antenna |
| 14. small hole | |
| 17. ranging module | 15. reflector group |
| 60. single-point receiving unit | 50. single-point emission unit |
| 202. X-axis feed network | 201. signal input unit |
| 204. electrically controlled X-axis phase modulation unit | 203. Y-axis feed network at |
| 206. X-axis connecting wire | 205. electrically controlled Y-axis phase modulation unit |
| 208. coupling unit | 207. Y-axis connecting wire |

DETAILED EMBODIMENTS

In order to more clearly describe the present application, the present application is further described below with reference to the drawings.

Please refer to FIG. 1 and FIGS. 4-6, compared to the prior art, the lidar transceiver antenna based on an OPA, provided by the present application, includes a ranging module 17 based on a single-point transceiver, a signal processing module 7, a central controller 20 and a laser driving module 2. The laser driving module 2 and the signal processing module 7 are connected to the central controller 20. The ranging module 17 ranges a target object by using the ToF ranging method, and includes a single-point emission unit 50 used as an emitting terminal to generate an optical signal and a single-point receiving unit 60 used as a receiving terminal to receive the optical signal reflected by the target object. The laser driving module 2 drives the single-point emission unit 50 to emit a light beam, and controls an optical signal emission direction of the light beam. The single-point receiving unit 60 receives the optical signal reflected by the target object, and transmits it to the signal processing module 7 for processing so as to compute displacement of the target object.

The emission-type OPA chip 4 in the single-point emission unit 50 uses an OPA as an emission and scan unit, and the single-point receiving unit 60 uses a reception-type OPA chip 9 synchronized with the emission-type OPA chip 4 to receive the optical signal reflected by the target object and to form a reflective OPA, so that the single-point receiving unit 60 can maintain the characteristic of a narrow field of view and maintain the advantage of the scanning lidar with a high signal-to-noise ratio.

Figure 2:
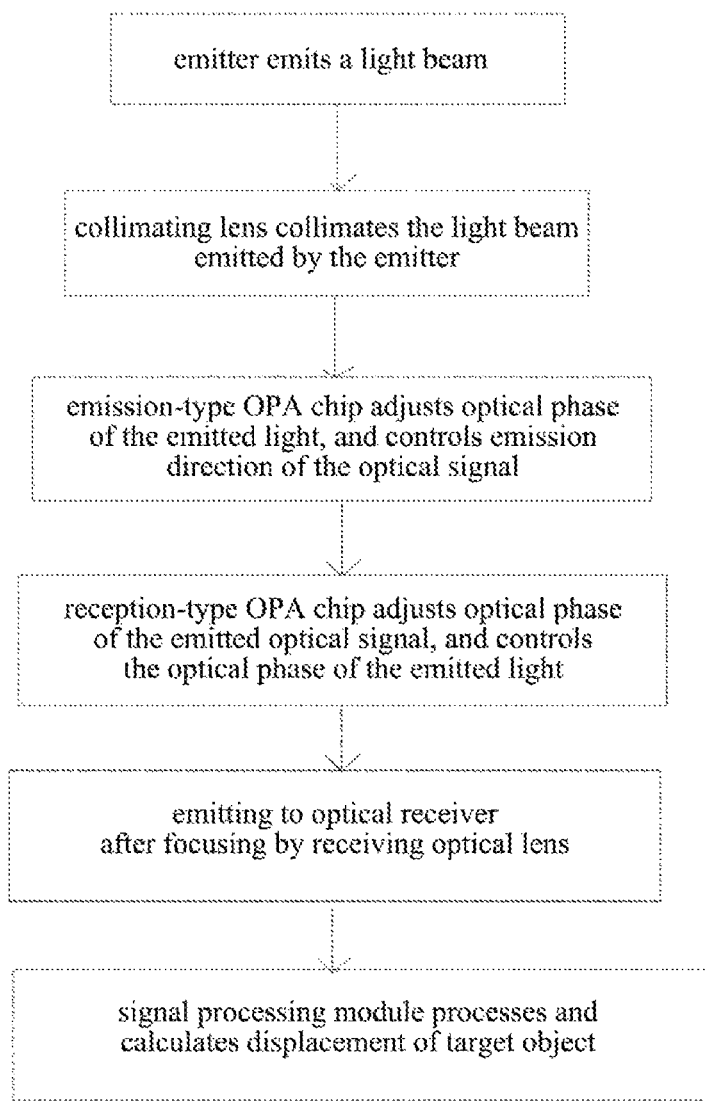
FIG. 2 is a flowchart of the present application.

Further, the single-point emission unit 50 includes an emitter 1 configured to emit an optical signal, a emission-type OPA chip 4 configured to control an emission direction of the optical signal, and a collimating lens 3 configured to collimate the optical signal. Please refer to FIG. 2, which shows a flowchart of the present application. The emitter 1 emits a light beam to generate an optical signal, the collimating lens 3 collimates and filters the optical signal to collimate the divergent emergent light to approximately parallel light and couple the approximately parallel light to the emission-type OPA chip 4, and an emission-type OPA is formed on the optical scanning unit to perform phase adjustment on the emitted optical signal so as to control the emission direction of the emitted optical signal. Specifically, the emitter 1 is connected to the laser driving module 2, and the emission-type OPA chip 4 is connected to the central controller 7 and is electrically controlled and modulated by the central controller 7. The emission-type OPA chip 4 controls phase delay by using a way of free-space optical coupling and electrical modulation, and an active area of the emission-type OPA is greater than 4 mm$^2$.

Furthermore, the single-point receiving unit 60 includes a reception-type OPA chip 9, a receiving optical lens 8, and an optical receiver 6. When passing through the optical scanning unit of the reception-type OPA chip 9, the optical signal reflected by the target object forms a reflective OPA. The reception-type OPA chip 9 adjusts the phase of the reflected optical signal, controls the reflection direction of the reflected optical signal, and is connected to the central controller 7, and also controls the phase delay by using the way of free-space optical coupling and electrical modulation, so as to realize synchronization with the emission-type OPA chip 4. In order to increase the optical aperture of the received optical signal emitted by the target object, an active area of the reception-type OPA chip 9 is greater than 25 mm$^2$. The receiving optical lens 8 focuses the reflected optical signal to the optical receiver 6, and the optical receiver 6 receives the optical signal reflected by the target object and transmits the signal to the signal processing module 7 for processing.

Figure 3:
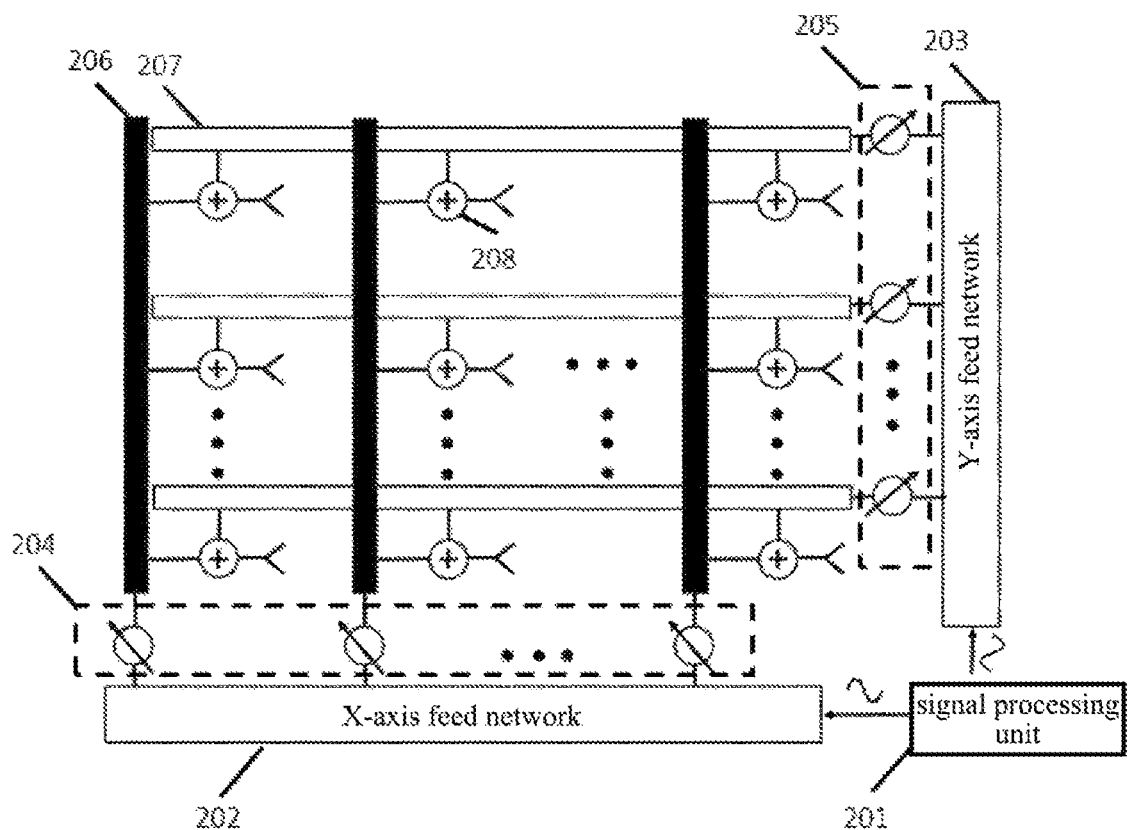
FIG. 3 is a schematic diagram of a control framework of the OPA of the present application.

Further, the beam deflection control of the present application is implemented by the free-space coupled OPA (also referred to as the spatial light modulator). The emission-type OPA chip 4 controls the OPA that emits light, and the reception-type OPA chip 9 controls the OPA that receives light. Specifically, as shown in FIG. 3, each of the emission-type OPA chip 4 and the reception-type OPA chip 9 is a chip provided with an optical scanning unit and having a resonant structure, and includes a signal input unit 201, an optical antenna (not shown), a coupling unit 208, an electrically controlled phase modulation unit including an X-axis electrically controlled phase modulation unit 204 and a Y-axis electrically controlled phase modulation unit 205, and a feed network including an X-axis feed network 202 and a Y-axis feed network 203. The phase adjustment for the optical signal in the emission-type OPA chip 4 and the reception-type OPA chip 9 are both divided to X-axis phase adjustment and Y-axis phase adjustment which are independently controlled. The processing for the emitted optical signal by the emission-type OPA chip 4 is consistent with the processing for the reflected optical signal by the reception-type OPA chip 9. Specifically: the optical scanning unit (not shown) in the signal input unit 201 scans the light wave signal of the received beam and generates a control signal, which is usually a sine/cosine or triangle wave, and the modulation frequency is determined according to the needs of the system. The control signal is transmitted by the X-axis feed network 202 to the X-axis electrically controlled phase adjustment unit 204 for optical phase adjustment of the X-axis, and is also transmitted by the Y-axis feed network 203 to the Y-axis electrically controlled phase adjustment unit 205 for optical phase adjustment of the Y-axis. The X-axis electrically controlled phase adjustment unit 204 and the Y-axis electrically controlled phase adjustment unit 205 are simplified as linear phase shifters, which respectively control the X-axis phase control signal and the Y-axis phase control signal. The X-axis electrically controlled phase adjustment unit 204 is connected to the optical antenna through the X-axis connection wire 206, the Y-axis electrically controlled phase adjustment unit 205 is connected to the optical antenna through the Y-axis connection wire 207, and the phase control signals of the X-axis electrically controlled phase adjustment unit 204 and the Y-axis electrically controlled phase adjustment unit 205 are output to the optical antenna after being coupled by the coupling unit 208.

These embodiments combine the electrically controlled optical phase array with traditional optical components, such as the collimating lens 3, the receiving optical lens 8, and the like, to achieve the functions such as collimation by the traditional optical lens, thereby greatly reducing the difficulty of designing and controlling the optical phase array. In addition, the emission-type OPA chip 4 and the reception-type OPA chip 9 in these embodiments both have a resonant structure. For example, the optical antenna is a nano-antenna, so that the emission-type OPA and the reception-type OPA will play a role of narrow-band filtering, which can further improve signal-to-noise ratio of the system and simplify structure of the system.

In the present application, through combining traditional optical tools with the optical phase array, solid state of the transceiver antenna is realized, which greatly reduces the requirements for micro-nano processing technology. In addition, in the present application, a design of the OPA in which the emission and reception of the light source are synchronous is adopted, which avoids the single-point receiving unit 60 using a wide-angle receiving mode, and maintains the technical characteristic of the narrow field of view of the lidar, so that the radar is more adapted to environment with strong light and has higher signal-to-noise ratio and stronger anti-interference ability. The use of resonant OPA will further replace the function of the narrow-band filter and achieve a better filtering effect.

Figure 4:
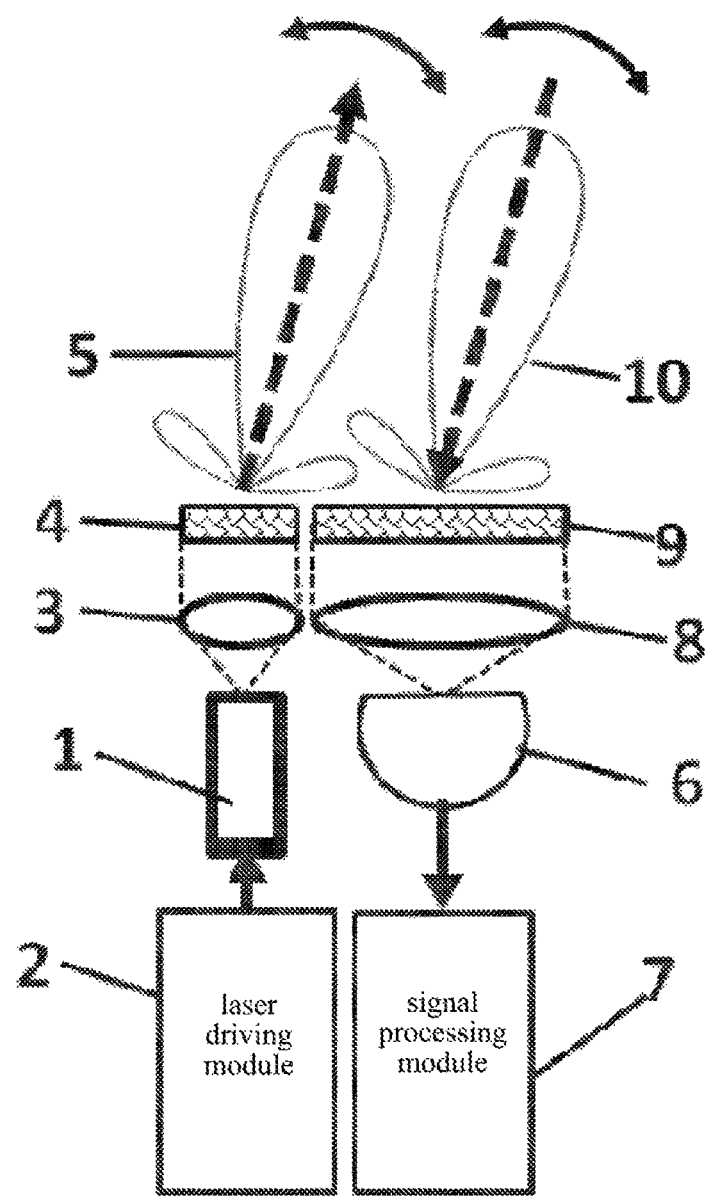
FIG. 4 is a structural schematic diagram of a typical transmissible OPA system of the present application.

In another embodiment, as shown in FIG. 4, the present application adopts a design of dual optical axes, that is, the emitting optical axis is separated from the receiving optical axis, and the optical scanning units of the emission-type OPA chip 4 and the reception-type OPA chip 9 are transmissible optical phase arrays. Specifically, the transmitter 1 uses a semiconductor laser of 905 nm, and the laser driving module 2 is composed of an analog circuit, which generates an electric pulse with a peak power of 70 W and a full width at half maximum (FWHM) of 5 nanoseconds. The collimating lens 3 is an aspherical lens, and its material is Polymethylmethacrylate (PMMA), which has good light transmittance. Of course, this embodiment is not limited to the collimating lens 3 made of PMMA, and the collimating lens 3 may also be made of polycarbonate (PC), glass (silicon dioxide), zinc selenide (ZnSe), and zinc sulfide (ZnS), calcium fluoride (CaF2), magnesium fluoride (MgF2), lithium fluoride (LiF), silicon (Si) single crystal, germanium (Ge) single crystal, or the like. The divergence angle between the fast axis and the slow axis of the laser beam emitted by the emitter 1 is 3 mrad after the fast axis and the slow axis are collimated by the collimating lens 3 respectively. The collimated laser beam is vertically coupled to the optical scanning unit, and forms the emission-type OPA through the emission-type OPA chip 4. This phased array is controlled by an electrical signal from the central controller 20, and performs phase modulation for the laser beam passing through each pixel unit of the phased array. At the emission direction of the emission-type OPA modulated and formed by the emission-type OPA chip 4, a lobe pattern 5 of the emitted light is formed. The wavefront of the emitted light of the phased array is modulated to a specific angle, and the electrical modulation signal is changed to achieve electrically controlled scanning. The single-point receiving unit 60 uses an avalanche diode (APD) of a single-pixel unit as the optical receiver 6, and the received optical signal is processed by the signal processing module 7, and the processing includes amplifying small signal, peak hold, and timing, etc. The light receiving antenna of the single-point receiving unit 60 is realized by the receiving optical lens 8 and the reception-type OPA chip, and the receiving optical lens 8 is a large-area (5 mm-40 mm diameter) PMMA convex lens which has a large clear aperture to pass through the received light. Both the emission-type OPA chip 4 and the reception-type OPA chip 9 are connected to the central controller 20 and electrically controlled and modulated by the central controller 20, and the electrical control signal of the reception-type OPA chip 9 is synchronized with and the electrical control signal of the emission-type OPA chip 4, and the electrical control signals are provided with the same or close lobe pattern of the received light. The design of the emission and reception synchronization in the OPAs maintains the technical characteristic of the narrow field of view of the lidar, thereby making the radar more adaptable to strong light environments, provided with a higher signal-to-noise ratio and stronger anti-interference ability.

In order to facilitate the focusing of the optical signal, the above-mentioned collimating lens 3 and the receiving optical lens 8 may be designed as a single lens or a lens group, so as to meet the standard of optical signal concentration. In addition, after the collimating lens 3 collimates the laser or LED light source, the divergence angle is less than 10 mrad, and the receiving optical lens 8 focuses the collected optical signal on the optical receiver 6. The electrically controlled modulation ways of the emission-type OPA chip 4 and the reception-type OPA chip 9 are not limited to electrically controlled modulation based on liquid crystal, electrically controlled modulation based on a piezoelectric ceramic material, electrically controlled modulation based on non-linear crystal, or electrically controlled modulation based on a nano-antenna. Moreover, the emission-type OPA chip 4 and the reception-type OPA chip 9 both have a resonant structure, such as a nano-antenna. The emission-type OPA and the reception-type OPA will play a role of narrow-band filtering, which can further improve the signal-to-noise ratio of the system and simplify the structure of the system.

The ranging module of this embodiment is based on a ranging method using ToF of a pulse (including ranging mechanisms using a pulse, a phase, or a continuous wave with frequency modulation). In the ranging method using a pulse, the ranging method using a phase, or the ranging method using a continuous wave with frequency modulation, the optical collimation and focusing are achieved by traditional optical lenses, while the optical scanning is achieved by two OPAs in which the emission terminal and the reception terminal are provided with synchronize electrical signals.

Figure 5:
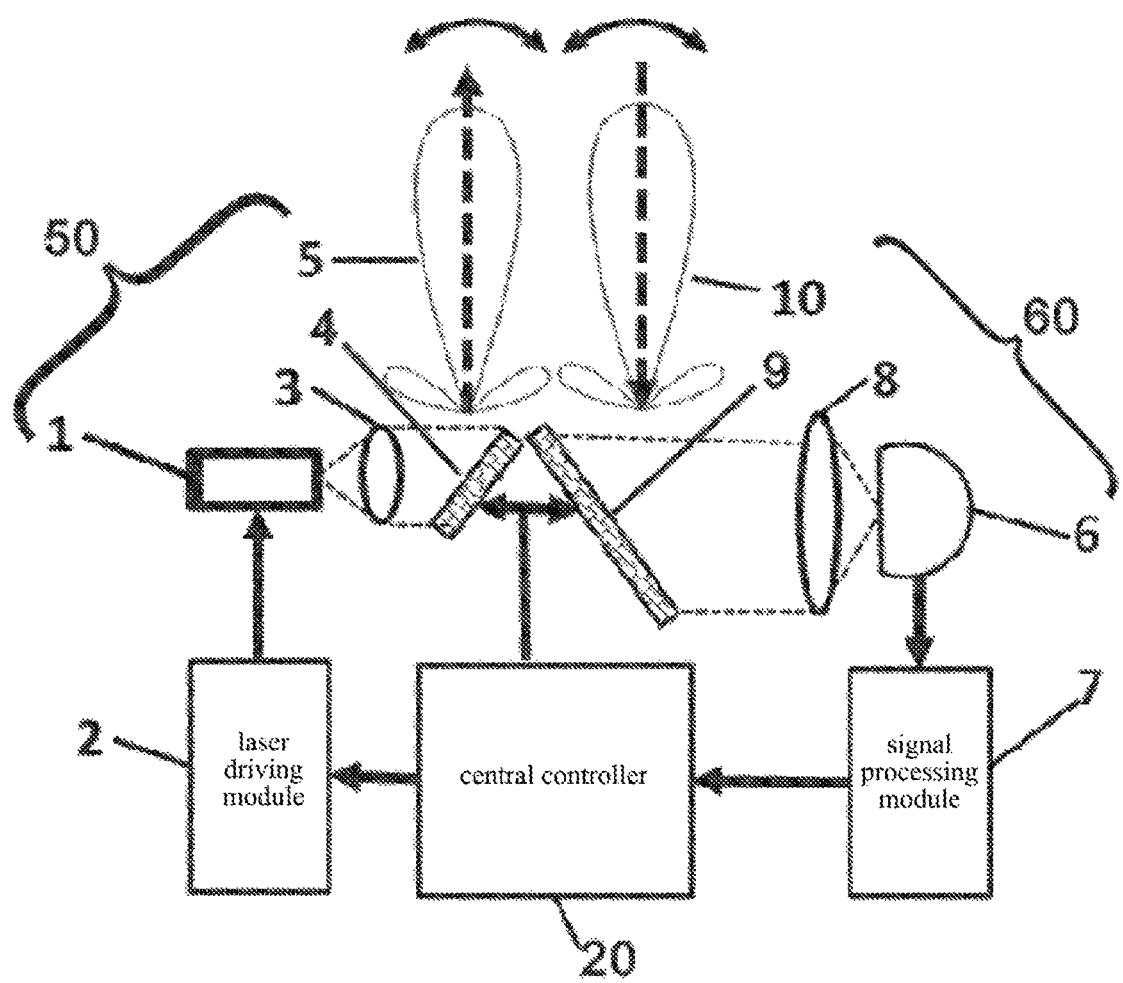
FIG. 5 is a structural schematic diagram of a reflective OPA system of the present application.

Please refer to FIG. 5, in yet another embodiment, the present application adopts a design of dual optical axes, and the emission optical axis is separated from the receiving optical axis, and both the emission-type OPA chip 4 and the reception-type OPA chip 9 use the reflective OPA. The single-point emission unit 50 uses a semiconductor laser of 905 nm as the emitter 1, and is driven by the laser driving module 2 to emit a light beam. After collimated by the collimating lens 3, the light beam is directed to the reflective OPA formed by the OPA chip 4. After the optical signal reflected by the detection target passes through the reflective OPA formed by reception-type OPA chip 9 of the single-point receiving unit 50, the optical signal is guided to the detection light collection aperture, and is focused on the optical receiver 6 after passing through the receiving optical lens 8. The received signal is processed by the signal processing module 7. The design and processing of the transceiver antenna of the lidar based on the reflective OPA provided in this embodiment are relatively simple and easy to be realized.

Figure 6:
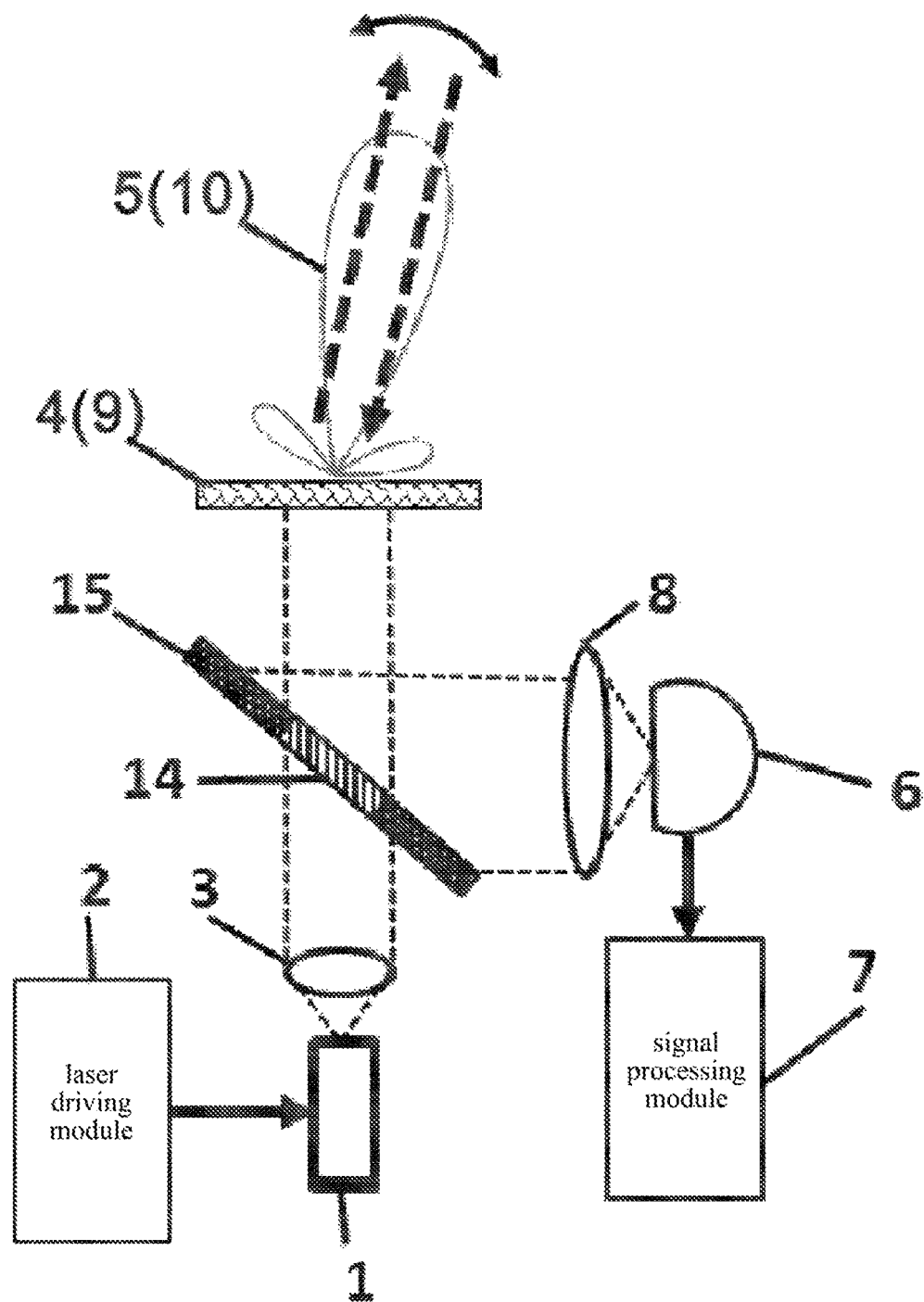
FIG. 6 is a structural schematic diagram of a co-axial system of the present application.

In yet another embodiment, referring to FIG. 6, the present application can also adopt the design of a single optical axis, that is, the emission optical axis is coaxial with the receiving optical axis, and the emission-type OPA and the reception-type OPA are coplanar, and the optical scanning units of the emission-type OPA chip 4 and the reception-type OPA chip 9 both adopt the transmissible OPA. In addition to the collimating lens 3 and the receiving optical lens 8, a set of mirror group 15 is provided for reflecting the reflected optical signal to the single-point receiving unit 60, and the mirror group 15 is inclined. The collimating lens 3 and the receiving optical lens 8 face two inclined surfaces of the mirror group 15 respectively, and the mirror group 15 is provided with a small hole 14 thereon to pass through the optical signal. Specifically, the single-point emission unit uses a semiconductor laser in which an emission light source has a wavelength of 905 nm as the emitter 1, and is driven by the pulse laser driving module 2 to emit the light beam. After the light beam is collimated by the collimating lens 3, a collimated light beam is obtained, which then passes through the small hole 14 and is directly illuminated on the emission-type OPA formed by the optical scanning unit in the emission-type OPA chip 4. After the signal light reflected by the target passes through the reception-type OPA controlled by the reception-type OPA chip 9, the output wavefront is modulated to within the light collecting aperture, and then the signal light passes through the mirror group 15 provided with the small hole 14 and passes through the receiving optical lens 8, then it is focused on the optical receiver 6, and then the signal processed by the signal processing module 7 to read the ranging signal.

The advantages of the present application lie in the following.

1. The transceiver antenna of the scanning lidar is solidified. Through using traditional optical devices, the functions such as laser collimation and focusing parallel light are realized by traditional optical lenses, and the optical function of electrically controlled scanning is realized by OPA, thereby greatly reducing difficulty in design and processing.

2. The transceiver antenna uses the optical scanning unit including the emission-type OPA and the reception-type OPA as optical windows for emitting and receiving light beam. After the control signals of the OPAs for emitting and receiving light beam are synchronized, the advantage of the high signal-to-noise ratio of the lidar with narrow field of view can be effectively maintained, thereby avoiding the use of the receiving antenna with large field of view and the use of the area array receiver, so as to not only improve the signal-to-noise ratio, but also greatly reduce the system cost and reduce the system complexity.

3. Both the emission-type OPA chip and the reception-type OPA chip adopt a resonant structure, for example, the optical antenna is a nano-antenna. The emission-type OPA and the reception-type OPA will play a role of narrow-band filtering, which can further improve the signal-to-noise ratio of the system, and simplify the structure of the system.

The above description only describes preferred embodiments of the present application, and is not intended to limit the present application. Any modification, equivalent replacement, and improvement made within the spirit and principle of the present application shall be included in the protection scope of the present application.

What is claimed is:

1. A lidar transceiver antenna based on an optimal phased array, the lidar transceiver antenna comprising: a ranging module based on a single-point transceiver, a signal processing module, a central controller and a laser driving module, wherein the laser driving module and the signal processing module are connected to the central controller; wherein the ranging module comprises a single-point emission unit and a single-point receiving unit configured to receive an optical signal reflected by a target object, the single-point emission unit comprises an emitter generating the optical signal and an emission-type optimal phased array chip configured to adjust optical phase of the emitted optical signal, the single-point receiving unit comprises an reception-type optimal phased array chip configured to adjust the optical phase of the optical signal reflected by the target object and an optical receiver configured to receive emitted light, the emitter is connected to the laser driving module, the laser driving module is configured to drive the emitter to emit a light beam, the optical receiver is connected to the signal processing module, and the signal processing module processes the optical signal emitted by the optical receiver and computes distance of the target object; wherein the emission-type optimal phased array chip and the reception-type optimal phased array chip are connected to the central controller, the emission-type optimal phased array chip controls emission direction of the emitted light, and the reception-type optimal phased array chip controls emission direction of received light.

2. The lidar transceiver antenna according to claim 1, wherein each of the emission-type optimal phased array chip and the reception-type optimal phased array chip is a chip having a resonant structure, and comprises a signal input unit, an optical antenna, an electrically controlled phase modulation unit, a feed network and a coupling unit, the signal input unit is provided with an optical scanning unit, and receives the optical signal, and generates a control signal transmitted to the electrically controlled phase modulation unit by the feed network, the electrically controlled phase modulation unit adjusts optical phase of the optical signal, and the coupling unit couples the control signal of the phase and transmits the control signal to the optical antenna; an active area of an optimal phased array of the emission-type optimal phased array chip is greater than 4 $mm^2$, and an active area of an optimal phased array of the reception-type optimal phased array chip is greater than 25 $mm^2$.

3. The lidar transceiver antenna according to claim 1, wherein the single-point emission unit further comprises a collimating lens configured to collimate the emitted light, the collimating lens is designed as a single lens or a lens group; a fast axis and a slow axis of the light beam emitted by the emitter are respectively collimated by the collimating lens, such that divergent emergent light is collimated to be approximately parallel light which is vertically coupled to the emission-type optimal phased array chip, and emergent direction of the light is adjusted by the emission-type optimal phased array chip.

4. The lidar transceiver antenna according to claim 1, wherein the single-point receiving unit further comprises a receiving optical lens combined by a single lens or a lens group and having a diameter ranging from 5 mm to 40 mm, such that a larger clear aperture is obtained to pass through the optical signal reflected by the target object and the optical signal reflected by the target object is focused to the optical receiver.

5. A ranging method, applied to a lidar transceiver antenna, wherein a ranging module of the lidar transceiver antenna ranges a target object by a way of ranging time-of-flight, and the method comprises steps of:
controlling, by a central controller of the lidar transceiver antenna, a laser driving module of the lidar transceiver antenna to drive an emitter of the lidar transceiver antenna to emit a light beam as a light signal source;
collimating, by a collimating lens of the lidar transceiver antenna, the light beam emitted by the emitter and transmitting the collimated light beam to an emission-type optimal phased array chip of the lidar transceiver antenna;
receiving, by the emission-type optimal phased array chip of the lidar transceiver antenna, an optical signal transmitted by the collimating lens, and controlling an emission direction of an emitted light through performing an optical phase adjustment on the emitted light;
receiving, by a reception-type optimal phased array chip of the lidar transceiver antenna, the emitted light reflected by the target object, and controlling an emission direction of a received light through performing the optical phase adjustment on the received light;
focusing, by a receiving optical lens of the lidar transceiver antenna, the received light and transmitting a focused light to an optical receiver of the lidar transceiver antenna, and then calculating a displacement of the target object by a signal processing module of the lidar transceiver antenna.

6. The method according to claim 5, wherein an electrically controlled phase modulation unit in each of the emission-type optimal phased array chip and the reception-type optimal phased array chip comprises an X-axis electrically controlled phase modulation unit and a Y-axis electrically controlled phase modulation unit, and a feed network comprises an X-axis feed network and a Y-axis feed network; when phase adjustment is performed on the optical signal, an optical phase adjustment of an X axis and an optical phase adjustment of a Y axis are performed respectively, and then a coupling process is performed; a phase adjustment process for the emitted light by the emission-type optimal phased array chip is consistent with a phase processing process for the received light by the reception-type optimal phased array chip, and an optical signal is processed as follows:
an optical scanning unit of a signal input unit scans the optical signal and generates a control signal;
the control signal is transmitted to the X-axis electrically controlled phase modulation unit through the X-axis feed network of the feed network for the optical phase adjustment of the X axis, and the control signal is transmitted to the Y-axis electrically controlled phase modulation unit through the Y-axis feed network of the feed network for the optical phase adjustment of the Y axis;
an X-axis optical phase control signal is linked to an optical antenna through an X-axis connection wire, and a Y-axis optical phase control signal is linked to the optical antenna through a Y-axis connection wire;
a coupling unit couples the X-axis optical phase control signal and the Y-axis optical phase control signal to the optical antenna.

7. The method according to claim 5, wherein centers of the emitted light and the received light are on a same axis.

8. The method according to claim 5, wherein centers of the emitted light and the received light are on different axes.

9. The method according to claim 5, wherein the emission-type optimal phased array chip and the reception-type optimal phased array chip use a transmissible optimal phased array to perform an optical phase modulation for the emitted light and the received light.

10. The method according to claim 5, wherein the emission-type optimal phased array chip and the reception-type optimal phased array chip use a reflective optimal phased array to perform an optical phase modulation for the emitted light and the received light.

* * * * *